A. HOGG.
VESSEL BULKHEAD.
APPLICATION FILED DEC. 21, 1915.
1,222,867.
Patented Apr. 17, 1917.
4 SHEETS—SHEET 1.
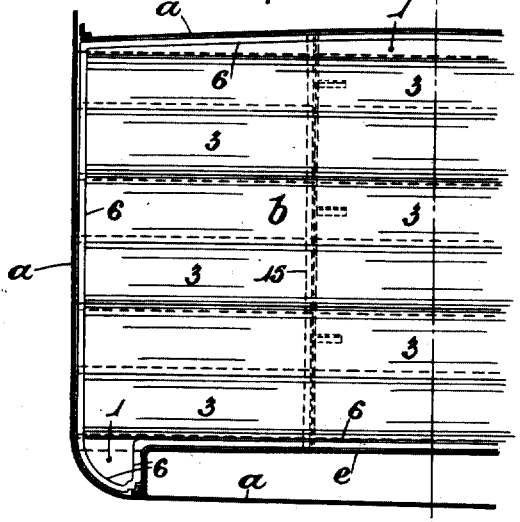
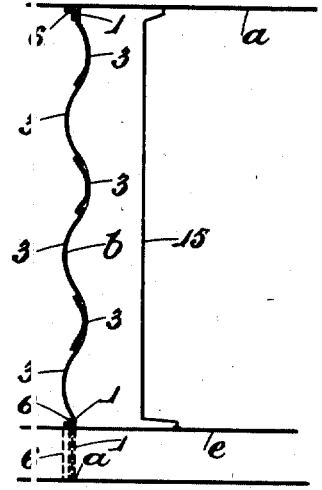
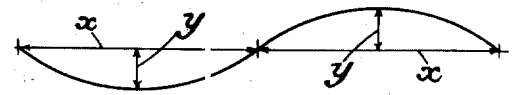
INVENTOR:
Archibald Hogg.
By M. Wallace White
ATTY.

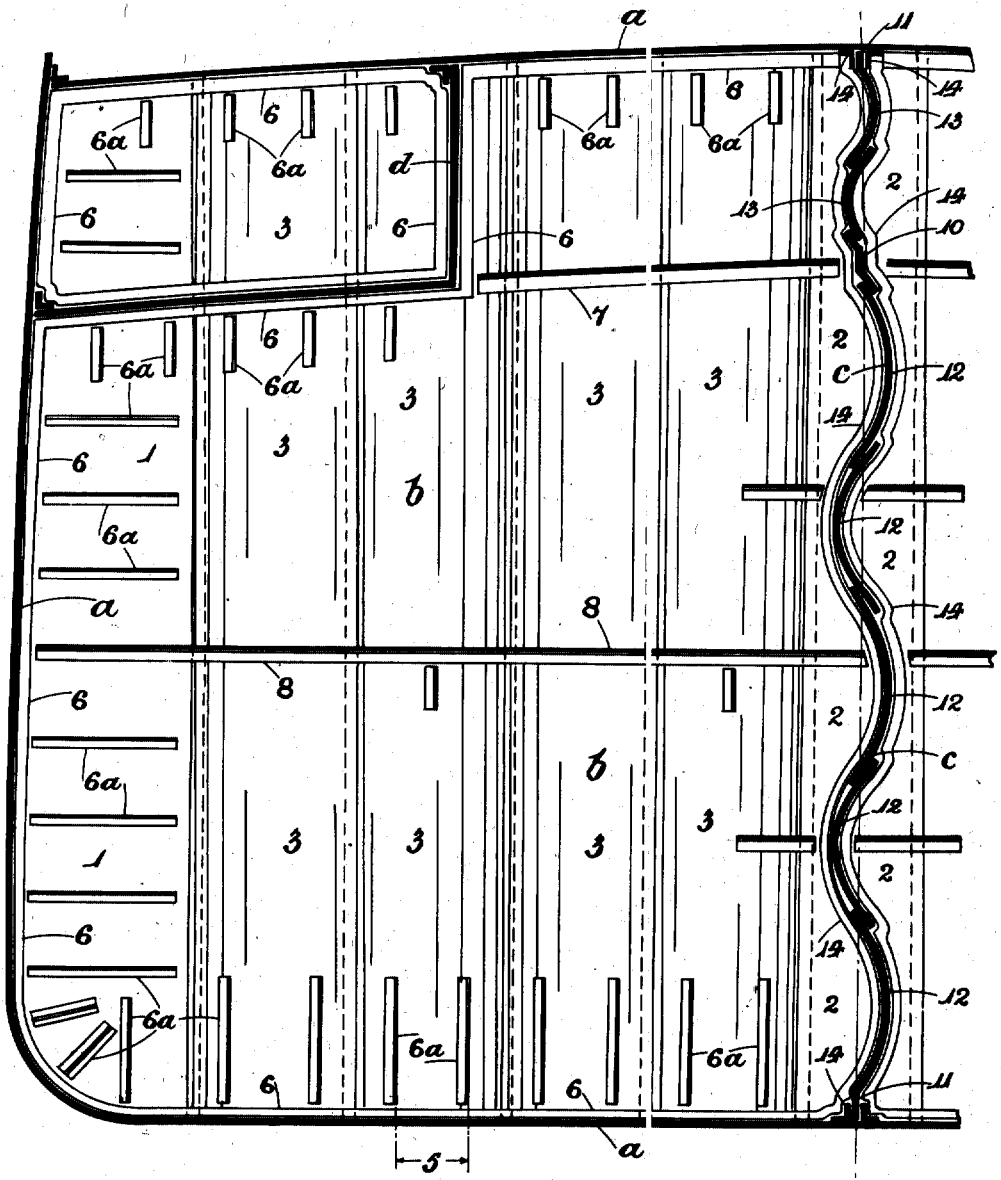

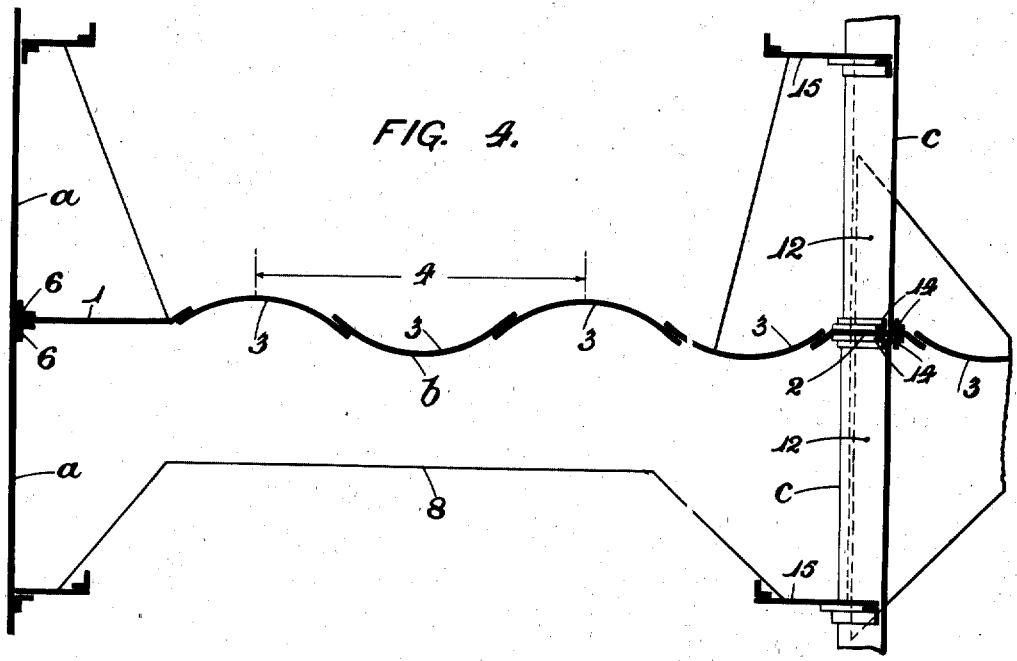
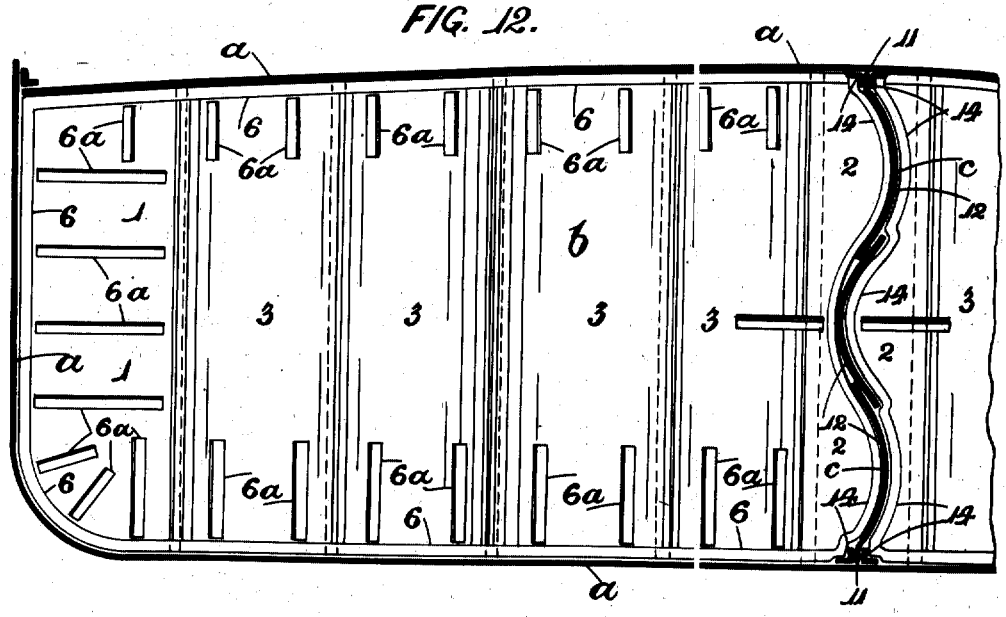

A. HOGG.
VESSEL BULKHEAD.
APPLICATION FILED DEC. 21, 1915.
1,222,867.
Patented Apr. 17, 1917.
4 SHEETS—SHEET 4.
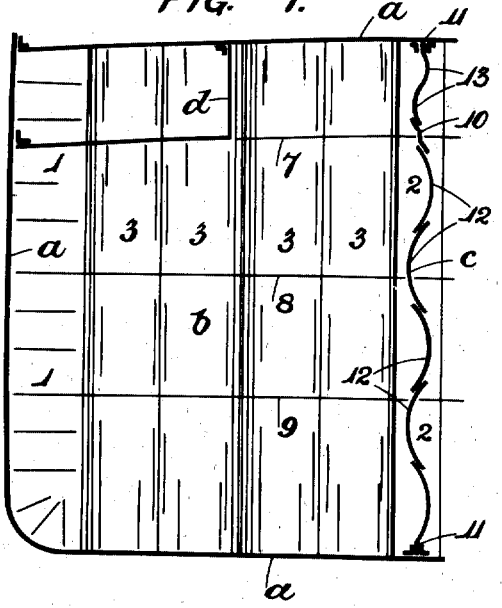
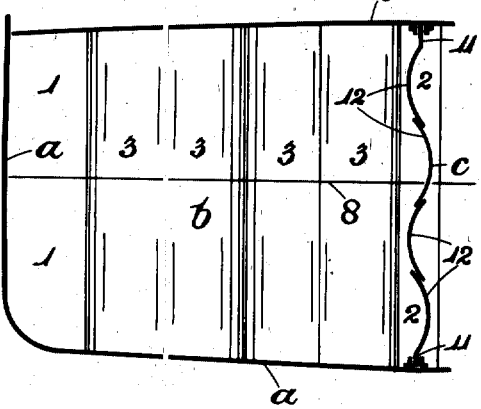
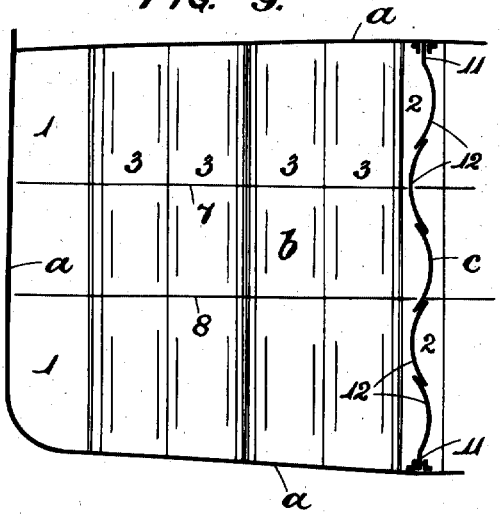
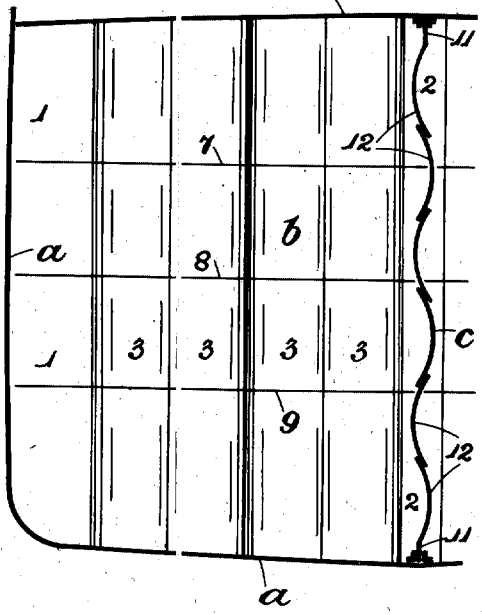
INVENTOR:
Archibald Hogg
BY Mr Wallace White
ATTY

UNITED STATES PATENT OFFICE.

ARCHIBALD HOGG, OF WALKER, NEWCASTLE-UPON-TYNE, ENGLAND.

VESSEL-BULKHEAD.

1,222,867.  Specification of Letters Patent.  Patented Apr. 17, 1917.

Application filed December 21, 1915. Serial No. 67,967.

*To all whom it may concern:*

Be it known that I, ARCHIBALD HOGG, a subject of the King of Great Britain and Ireland, residing at 80 Welbeck road, west, Walker, Newcastle-upon-Tyne, England, have invented new and useful Improvements in Vessel-Bulkheads, of which the following is a specification.

This invention relates to bulkheads for ships and other floating structures. The object of this invention is to provide an improved construction of bulkhead whereby a saving in the quantity of material employed is effected without detracting from the strength of the structure.

A bulkhead made in accordance with this invention is composed partly of flat plates and partly of plates which are curved. The curved plates are curved in reversed directions and disposed between the flat plates, the crests and valleys of the curved plates lying parallel with the long ways of the flat plates, the whole being supported along its boundary connections by angle bars, said boundary angle bars following the undulations on one side of the bulkhead from corner to corner.

Strong supports adapted to follow the undulations of the curved plates may be placed transversely of the crests and valleys of the curved plates and are connected to the plating of the bulkhead and to the main structure of the hull of the ship or other floating structure, and when a longitudinal bulkhead ends against or crosses a transverse bulkhead a flat plate is disposed in the transverse bulkhead for the other to butt against.

I have found that great efficiency can be obtained when the plates are bent to very flat curves and the arc of each curved plate limited to not more than one third of a circle.

In bulkheads made in accordance with this invention the plates are curved to a minimum radius of about 20 inches and a maximum radius of about 72 inches. The width distance between the crests of the plate curves is at the very least about 4 times the depth distance from crest to crest, two plates being usually required to complete a width equal to that between two crests.

In a bulkhead constructed with plates bent to such flat easy curves as in accordance with this invention it becomes easily possible for the bulkheads to be connected to the hull of the vessel or to the decks by angle bars which follow the curves of the plates on one side of the bulkhead from corner to corner of the bulkhead, and it becomes easily possible for the supports, connecting bars, and web plates to follow the curves of the plates in the same manner, resulting in these supports being farther apart than hitherto contemplated for stiffeners on flat plated bulkheads. From one to four supports, depending on the size of the bulkhead, may be effectively employed in bulkheads made in accordance with this invention.

I have found that excellent results are obtained when the width distance from crest to crest is from 8 feet to 10 feet 6 inches, and the depth distance from crest to reversed crest is from 16 to 20 inches, and that the supports may be disposed from 7 feet to 21 feet apart depending on the size and type of bulkhead.

For dry cargo ships the supports may be disposed about 15 feet apart, but may vary from 10 feet to 21 feet and the width distance of the curved plates may conveniently be about 8 feet apart from crest to crest with a depth distance of about 17 inches from crest to reversed crest; the exact dimensions would of course depend upon conditions, but in all cases the width distance between adjacent curve crests would exceed four times the depth distance from crest to reversed crest.

Figure 1 of the accompanying drawings represents a basis curve for such bulkheads, the radius of which is $41\frac{1}{2}$ inches, the distance (marked $x$) between the points where the curve cuts the base line is 50 inches, which distance is equal to half that between two crests, and the distance (marked $y$) between a crest or reversed crest and the base line is $8\frac{1}{2}$ inches. Each arc is less than one third of the circumference of a circle.

For liquid cargo ships the supports would be only 6 to 10 feet apart and the width distance of the curves about 10 feet from crest to crest and about 20 inches deep from crest to reversed crest, the actual dimensions employed depending upon conditions, but the width distance always exceeds four times the depth distance.

Fig. 2 of the drawings represents a basis curve for such bulkheads, the radius of which is 50 inches, the distance (marked $x$) between the points where the curve cuts the base line is 60 inches, which distance is equal to half that between two crests, and the distance (marked $y$) between a crest or reversed crest and the base line is 10 inches. Here again, each arc is less than one third of the circumference of a circle.

Fig. 3 is a half sectional elevation of a ship for carrying liquid cargoes, and shows a transverse bulkhead constructed and connected to the hull and to a fore and aft bulkhead, both in accordance with this invention, the undulations of the transverse bulkhead plating being vertical and that of the fore and aft bulkhead being horizontal.

Fig. 4 is a plan view of the bulkheads shown in Fig. 3, and shows the outline of the horizontal support in the lower part of the transverse bulkhead.

Fig. 5 is a half sectional elevation of a ship for carrying general cargoes and shows a transverse bulkhead constructed and connected to the hull in accordance with this invention, the undulations of the plating being horizontal.

Fig. 6 is a sectional elevation at right angles to Fig. 5 and shows the outline of the vertical support.

Fig. 7 is a similar view to Fig. 3 and shows diagrammatically a construction in which an additional horizontal support is used in the lower portion of the bulkhead.

Figs. 8, 9 and 10 are diagrammatic half elevations showing constructions where one, two, or three horizontal supports are used.

Fig. 11 is a diagrammatic elevation showing a construction in which three fore and aft bulkheads are used.

Fig. 12 is a half sectional elevation showing a construction where the dimensions of the bulkheads one way are relatively small.

In all the figures like marks of reference are used to indicate like parts.

Figs. 3 and 4 show the application of this invention to the bulkheads in ships intended for the carriage of liquid cargoes and which are constructed on the longitudinal framing system. $a$ is the hull of the ship, $b$ the transverse bulkhead, and $c$ the fore and aft bulkhead. The flat parts of the transverse bulkhead are marked 1 and 2, the curved plates forming the remainder of the bulkhead are marked 3 and are in this case curved to a radius of about 50 inches, the spacing from center to center of the crests of the curves, marked 4 (Fig. 4), is a multiple of the spacing, marked 5 (Fig. 3), of the hull framing of the bottom of the ship, say four times. The curved plates are connected to the flat plates by flanged joints. The whole transverse bulkhead is supported on or by the boundary angle bars, marked 6, including angle bars 14 connecting the transverse bulkhead $b$ to the fore and aft bulkhead $c$, and on or by the strong horizontal supports marked 7 and 8. In some cases an additional support would be used in the lower portion of the transverse bulkhead $b$, as indicated at 9 in Fig. 7, and in other cases, when there is no expansion trunkway $d$ (Figs. 3 and 7), there may be from one to three horizontal supports 7, 8, 9, as indicated in Figs. 8, 9 and 10. The boundary connecting angles 6 are continuous and follow the undulations from corner to corner of the bulkhead and form a four-sided frame construction. The short angles, marked $6^a$ (Fig. 3), are for the purpose of attaching to the usual connecting bracket plates of the longitudinal framing of the main hull which are not shown in the drawings as they form no part of my invention.

Figs. 3 and 4 also show the application of this invention to the fore and aft middle line bulkhead $c$ in a ship for carrying liquid cargoes, the flat parts of which bulkhead are marked 10 and 11. The curved plates are marked 12 and 13 and are curved to radii of about 50 and 26 inches respectively. The whole fore and aft bulkhead is supported on or by the boundary connecting angles, marked 14, and on strong vertical supports marked 15 (Fig. 4) which would be spaced at intervals of from 8 to 11 feet, depending on the general design of the ships' main framing, of which these supports form a part. The boundary connecting angles 14 are continuous, and follow the undulations from corner to corner of the fore and aft bulkhead. In some cases the flat part 10 may be dispensed with.

In cases where there is more than one fore and aft bulkhead $c$, there would be a flat part 2 in the transverse bulkhead $b$ in the way of each fore and aft bulkhead, as indicated in Fig. 11. In cases where the dimension, one way of the bulkheads is relatively small, the strong horizontal supports 7, 8, 9 of the transverse bulkhead $b$ may be dispensed with as shown by Fig. 12.

The overlaps at the edges of the plates forming the bulkheads may be placed at any part of the curve of said plates, though generally they would be either at the joint of the two curves as illustrated in the drawings, or at the middle of a crest.

Figs. 5 and 6 show the application of this invention to the bulkheads in a ship intended for the carriage of dry cargoes, and which have double bottom tanks $e$. The flat parts of the transverse bulkhead $b$ are marked 1 and the curved plates are marked 3 and are curved to a radius of $41\frac{1}{2}$ inches. The whole bulkhead is supported on the boundary angle bars marked 6, and on strong vertical supports marked 15, the boundary connecting angles being continuous and following the undulations from corner to corner of the bulkhead.

What I claim and desire to secure by Letters Patent is:—

1. A bulkhead construction for ships comprising a transverse bulkhead formed of flat plates and curved plates disposed so that the curves of adjacent plates are reversed, the flat plates lying at the edges of the bulkhead parallel with the crests and valleys of the curved plates, the arc of each plate curve being limited in extent to not more than one third of a circle and the width distance between adjacent curve crests exceeding four times the depth distance from crest to reversed crest, flanged joints between said flat plates and curved plates, and a continuous four-sided boundary frame comprising at least one angle bar, two sides of said frame being formed with broad shallow undulations which enter the undulations of the curved plates of the bulkhead, said frame being attached on all four sides both to the bulkhead and to the hull of the ship, all as set forth in the specification.

2. A bulkhead construction for ships comprising a transverse bulkhead formed of flat plates and curved plates disposed so that the curves of adjacent plates are reversed, the flat plates lying at the edges of the bulkhead parallel with the crests and valleys of the curved plates, the arc of each plate curve being limited in extent to not more than one third of a circle and the width distance between adjacent curve crests exceeding four times the depth distance from crest to reversed crest, flanged joints between said flat plates and curved plates, and a continuous four-sided boundary frame comprising at least one angle bar, two sides of said frame being formed with broad shallow undulations which enter the undulations of the curved plates of the bulkhead, said frame being attached on all four sides both to the bulkhead and to the hull of the ship, and not less than one support placed transversely of the crests and valleys of the curved plates, said support entering the undulations thereof and being connected to the plating of the transverse bulkhead and the hull of the ship, all as set forth in the specification.

3. A bulkhead construction for ships comprising a transverse bulkhead formed of flat plates and curved plates disposed so that the curves of adjacent plates are reversed, the flat plates lying intermediate of the curved plates and at the edges of the bulkhead parallel with the crests and valleys of the curved plates, the arc of each plate curve being limited in extent to not more than one third of a circuit and the width distance between adjacent curve crests exceeding four times the depth distance from crest to reversed crest, flanged joints between said flat plates and curved plates, and a continuous four-sided boundary frame comprising at least one angle bar, two sides of said frame being formed with broad shallow undulations which enter the undulations of the curved plates of the bulkhead, said frame being attached on all four sides both to the bulkhead and to the hull of the ship, and a longitudinal bulkhead abutting against the intermediate flat plates of said transverse bulkhead, said longitudinal bulkhead being formed of flat plates and curved plates of the same limited curvature as the curved plates of said transverse bulkhead, flanged joints between the flat plates and curved plates of the longitudinal bulkhead, and means for attaching the longitudinal bulkhead to the transverse bulkhead and to the hull of the ship, all as set forth in the specification.

4. A bulkhead construction for ships comprising a transverse bulkhead formed of flat plates and curved plates disposed so that the curves of adjacent plates are reversed, the flat plates lying intermediate of the curved plates and at the edges of the bulkhead parallel with the crests and valleys of the curved plates, the arc of each plate curve being limited in extent to not more than one third of a circle and the width distance between adjacent curve crests exceeding four times the depth distance from crest to reversed crest, flanged joints between said flat plates and curved plates, and a continuous four-sided boundary frame comprising at least one angle bar, two sides of said frame being formed with broad shallow undulations which enter the undulations of the curved plates of the bulkhead, said frame being attached on all four sides both to the bulkhead and to the hull of the ship, and a longitudinal bulkhead abutting against the intermediate flat plates of said transverse bulkhead, said longitudinal bulkhead being formed of flat plates and curved plates of the same limited curvature as the curved plates of said transverse bulkhead, flanged joints between the flat plates and curved plates of the longitudinal bulkhead, and means for attaching the longitudinal bulkhead to the transverse bulkhead and to the hull of the ship, and not less than one support placed transversely of the crests and valleys of the curved plates, said support entering the undulations thereof and being connected to the plating of the longitudinal bulkhead and the hull of the ship, all as set forth in the specification.

5. A bulkhead construction for ships comprising a transverse bulkhead formed of flat plates and curved plates disposed so that the curves of adjacent plates are reversed, the flat plates lying intermediate of the curved plates and at the edges of the bulkhead parallel with the crests and valleys of the curved plates, the arc of each plate curve being limited in extent to not more than one third of a circle and the width distance between adjacent curve crests exceeding four times the depth distance from crest to reversed crest, flanged joints between said flat plates and curved plates, and a continuous four-sided boundary frame comprising at least one angle bar, two sides of said frame being formed with broad shallow undulations which enter the undulations of the curved plates of the bulkhead, said frame being attached on all four sides both to the bulkhead and to the hull of the ship, and not less than one support placed transversely of the crests and valleys of the curved plates, said support entering the undulations thereof and being connected to the plating of the transverse bulkhead and the hull of the ship, and a longitudinal bulkhead abutting against the intermediate flat plates of said transverse bulkhead, said longitudinal bulkhead being formed of flat plates and curved plates of the same limited curvature as the curved plates of said transverse bulkhead, flanged joints between the flat plates and curved plates of the longitudinal bulkhead, and means for attaching the longitudinal bulkhead to the transverse bulkhead and to the hull of the ship, all as set forth in the specification.

6. A bulkhead construction for ships comprising a transverse bulkhead formed of flat plates and curved plates disposed so that the curves of adjacent plates are reversed, the flat plates lying intermediate of the curved plates and at the edges of the bulkhead parallel with the crests and valleys of the curved plates, the arc of each plate curve being limited in extent to not more than one third of a circle and the width distance between adjacent curve crests exceeding four times the depth distance from crest to reversed crest, flanged joints between said flat plates and curved plates, and a continuous four-sided boundary frame comprising at least one angle bar, two sides of said frame being formed with broad shallow undulations which enter the undulations of the curved plates of the bulkhead, said frame being attached on all four sides both to the bulkhead and to the hull of the ship, and not less than one support placed transversely of the crests and valleys of the curved plates, said support entering the undulations thereof and being connected to the plating of the transverse bulkhead and the hull of the ship, and a longitudinal bulkhead abutting against the intermediate flat plates of said transverse bulkhead, said longitudinal bulkhead being formed of flat plates and curved plates of the same limited curvature as the curved plates of said transverse bulkhead, flanged joints between the flat plates and curved plates of the longitudinal bulkhead, and means for attaching the longitudinal bulkhead to the transverse bulkhead and to the hull of the ship, and not less than one support placed transversely of the crests and valleys of the curved plates, said support entering the undulations thereof and being connected to the plating of the longitudinal bulkhead and the hull of the ship, all as set forth in the specification.

In testimony whereof I have signed my name to this specification in the presence of two subscribing witnesses.

ARCHIBALD HOGG.

Witnesses:
HERBERT HOWARD,
GEORGE FORSTER.